US010803783B2

(12) United States Patent
Wang et al.

(10) Patent No.: US 10,803,783 B2
(45) Date of Patent: Oct. 13, 2020

(54) ELECTRONIC SHELF DISPLAY APPARATUS

(71) Applicant: Dynascan Technology Corp., Taoyuan (TW)

(72) Inventors: Tsun-I Wang, Taoyuan (TW); Ching-Chun Wu, Taoyuan (TW); Chia-Liang Yang, Taoyuan (TW); Chih-Chin Hsu, Taoyuan (TW)

(73) Assignee: DYNASCAN TECHNOLOGY CORP., Taoyuan (TW)

( * ) Notice: Subject to any disclaimer, the term of this patent is extended or adjusted under 35 U.S.C. 154(b) by 0 days.

(21) Appl. No.: 16/263,535

(22) Filed: Jan. 31, 2019

(65) Prior Publication Data
US 2020/0251042 A1 Aug. 6, 2020

(51) Int. Cl.
*G09G 3/20* (2006.01)
*G06F 3/14* (2006.01)
(52) U.S. Cl.
CPC ......... *G09G 3/2092* (2013.01); *G06F 3/1431* (2013.01); *G09G 2330/04* (2013.01); *G09G 2360/04* (2013.01); *G09G 2380/04* (2013.01)
(58) Field of Classification Search
CPC ............. G09G 3/2092; G09G 2330/04; G09G 2360/04; G09G 2380/04; G06F 3/1431
See application file for complete search history.

(56) References Cited

U.S. PATENT DOCUMENTS

| 2006/0001595 A1* | 1/2006 | Aoki | G06F 3/1431 345/1.2 |
| 2011/0099061 A1* | 4/2011 | Giffin | G06Q 30/02 705/14.49 |
| 2012/0044056 A1* | 2/2012 | Byun | G06F 3/147 340/10.1 |
| 2014/0300186 A1* | 10/2014 | Grave | B61D 31/00 307/21 |
| 2018/0276690 A1* | 9/2018 | Sequeira | G06K 7/10366 |

FOREIGN PATENT DOCUMENTS

| CN | 203644230 U | 6/2014 |
| CN | 107003820 A | 8/2017 |
| CN | 108351696 A | 7/2018 |
| CN | 105931610 A | 9/2018 |

* cited by examiner

*Primary Examiner* — Stephen G Sherman
(74) *Attorney, Agent, or Firm* — Duane Morris LLP

(57) ABSTRACT

The present disclosure relates to an electronic shelf display apparatus. An electronic shelf display is provided. The electronic shelf display comprises a display module, an electronic paper (ePaper) module, a communication module, and a control module. The communication module receives a first signal indicating a first message to be displayed on the display module and receives a second signal indicating a second message to be displayed on the ePaper module. The control module is electrically connected to the communication module, the display module, and the ePaper module. The control module controls the display module and the ePaper module.

14 Claims, 3 Drawing Sheets

ELECTRONIC SHELF DISPLAY APPARATUS

BACKGROUND

1. Field of the Disclosure

The present disclosure relates to a display apparatus. More particularly, the present disclosure relates to an electronic shelf display apparatus.

2. Description of the Related Art

The paper labels disposed on the shelves of a store are used to show information and price of products on the shelves. These stores using paper labels need employees to print and replace paper labels of products if there are discounts or sales, which creates a large amount of workload.

Display apparatuses are widely used in different environments. Thanks to display apparatuses becoming smaller in size, the display apparatuses may be used as an electronic shelf display on shelves in a store. That is, a display apparatus may be arranged on a shelf to show information of products, so as to replace paper labels. The information shown on the display apparatus can be updated via a wireless communication network by a remote control system. Thus, information of the products in the entire store can be easily updated by keying the information to be updated, such as prices, on the remote control system.

Typically, the electronic shelf display may comprise a Liquid Crystal Display (LCD) module or an electronic paper (ePaper) module. It is well known that the communication module and the control module for an ePaper are very different from those for an LCD. The ePaper module is generally driven by a special control module and communicates with external devices via a Radio Frequency Identification (RFID) circuit, which obtains power from radio signals transmitted by a device which accesses the RFID circuit. Thus, the power consumption of the entire ePaper module is lower than that of the LCD module. For implementing electronic shelf displays, the LCD module and the ePaper module are alternatively used based on design choice.

SUMMARY

It is found that the LCD and the ePaper have their advantages and drawbacks. Compared with ePapers, LCDs have a backlight. Thus, the image displayed on LCDs can be easily identified by a viewer even in a dimly lit environment. The ePapers have low power consumption since they only need power when updating the content displayed thereon. If the power provided to LCDs is shut down, the content shown on the LCDs will vanish, while the content displayed on the ePapers would not vanish. In some countries, the prices of products must be shown to comply with local provisions even if the power is shut down. Furthermore, the content shown on the electronic shelf displays with an LCD can be scheduled, but the content shown on the electronic shelf displays with an ePaper cannot be scheduled. It is because ePaper modules are cheap, and it is not worth it to add a general purpose control unit (or system) (e.g., a system-on-chip) and a memory module to the ePaper module, so as to schedule the content to be displayed. In view of the above, we hereby provide a new electronic shelf display.

In one aspect according to some embodiments, an electronic shelf display comprises a display module, an electronic paper (ePaper) module, a communication module, and a control module. The communication module receives a first signal indicating a first message to be displayed on the display module and receives a second signal indicating a second message to be displayed on the ePaper module. The control module is electrically connected to the communication module, the display module, and the ePaper module. The control module controls the display module and the ePaper module.

In a preferred embodiment, the electronic shelf display further comprises an auxiliary lighting module and a power storage module. The auxiliary lighting module illuminates the ePaper module. The power storage module supplies power to the auxiliary lighting module when a power supply external to the electronic shelf display is shut down.

In a preferred embodiment, the power storage module supplies power to the control module, and the control module controls the ePaper module (14) to display an arrow indicating a direction of an exit if the power supply external to the electronic shelf display is shut down.

In a preferred embodiment, the electronic shelf display further comprises a sensing device. The sensing device is electrically connected to the control module and senses ambient light. The control module controls the ePaper module to display the arrow indicating the direction of the exit if the power supply external to the electronic shelf display is shut down and the sensed ambient light is lower than a threshold.

BRIEF DESCRIPTION OF THE DRAWINGS

For a better understanding of the nature and objects of some embodiments of the present disclosure, reference should be made to the following detailed description taken in conjunction with the accompanying drawings. In the drawings, identical or functionally identical elements are given the same reference numbers unless otherwise specified.

DETAILED DESCRIPTION

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the present disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the present disclosure may be combined in any suitable manner in one or more embodiments. One skilled in the relevant art will recognize that the present disclosure may be practiced without one or more of the specific features or advantages of a particular embodiment. In other instances, additional features and advantages may be recognized in certain embodiments that may not be present in all embodiments of the present disclosure.

Figure 1:
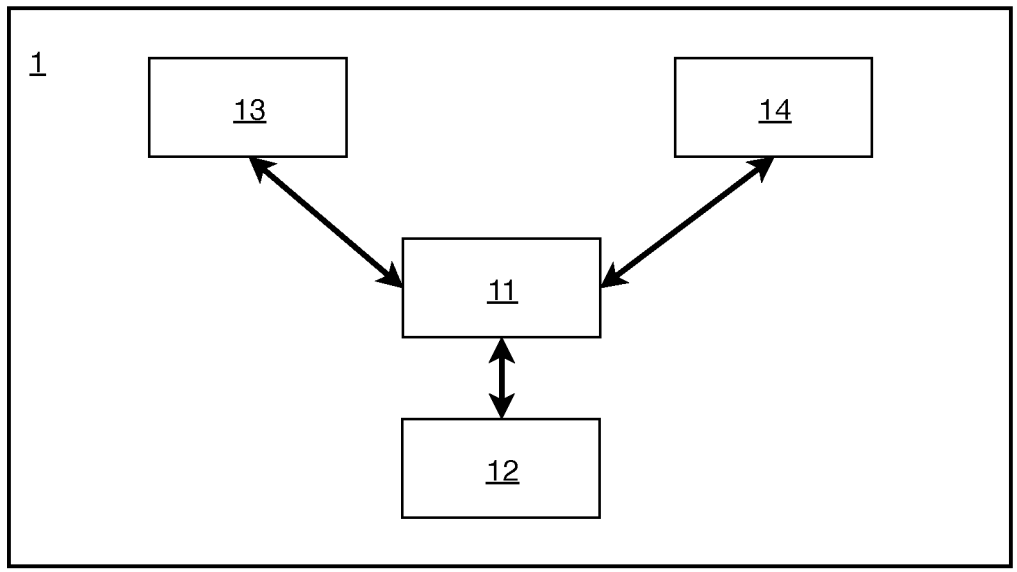
FIG. 1 illustrates an electronic shelf display according to some embodiments of the present disclosure.

FIG. 1 illustrates an electronic shelf display 1 according to some embodiments of the present disclosure. As shown in FIG. 1, the electronic shelf display 1 includes a control module 11, a communication module 12, a display module 13, and an electronic paper (ePaper) module 14. In some embodiments, the control module 11 includes a system-on-chip. In some embodiments, the communication module 12 includes a wireless network module (e.g., an IEEE 802.11 module, a Bluetooth module, or a near field communication module) or a wired network module. In some embodiments, the display module 13 may be an LCD module, an OLED module or other types of display modules.

The communication module 12 receives a signal indicating a message or content to be displayed on the display module 13 and receives another signal indicating a message or content to be display on the ePaper module 14. The control module 11 is electrically connected to the communication module 12, the display module 13, and the ePaper module 14. The control module 11 controls the display module 13 and the ePaper module 14, so as to display the received the message or content on the display module 13 and the ePaper module 14. In some embodiments, the message or content to be displayed on the display module 13 may be an image or a video.

In some preferred embodiments, the message or content to be displayed on the display module 13 may be an advertisement for a product on the shelf or a commercial for the latest sale information. In some preferred embodiments, the message or content to be displayed on the ePaper module 14 may be information for a product. The message or content to be displayed on the ePaper module 14 may be a price, a bar code, a QR (quick response) code, the place of production, possible allergens or other information of the product.

According to the present disclosure, a user of the electronic shelf display 1 may determine to show a message or content on either the display module 13 or the ePaper module 14 based on type of the message or content. When an LCD module or an OLED module displays content, it must be powered. If the power provided to the LCD module or the OLED module is shut down, the content displayed on the LCD module or the OLED module will vanish. To the contrary, ePapers need power only when updating the content displayed thereon. In other words, the content shown on ePapers remains unchanged no matter the ePaper module is powered or not. By arranging both a display module (e.g., the LCD module or the OLED module) and an ePaper module in the electronic shelf display, the important information of the product, which should be revealed all the time, can be shown on the ePaper module and the less important information, such as advertisements, can be selectively shown on the LCD module or the OLED module.

According to the embodiment of FIG. 1, the display module 13 and the ePaper module 14 share a controller and communication components (e.g., the control module 11 and the communication module 12). According to the embodiment of FIG. 1, the display module 13 and the ePaper module 14 are controlled or driven by the common controller (e.g., the control module 11). Since the control and communication mechanisms for an LCD display and an ePaper are very different, a display module and an ePaper module are generally controlled, driven, or updated separately. However, in the present disclosure, the display module 13 and the ePaper module 14 of the electronic shelf device 1 shown in FIG. 1 are both controlled by the control module 11. Based on the above arrangement, the control module 11 may be easily configured to simultaneously update the message or content displayed on the display module 13 and the message or content displayed on the ePaper module 14. For example, when a store has a big sale, the owner of the store can display a commercial about the big sale with the display module of the electronic shelf display, and update prices of products simultaneously. With the electric shelf display according to the present disclosure, the control of the display module and the ePaper module in the electronic shelf display is simplified.

Figure 2:
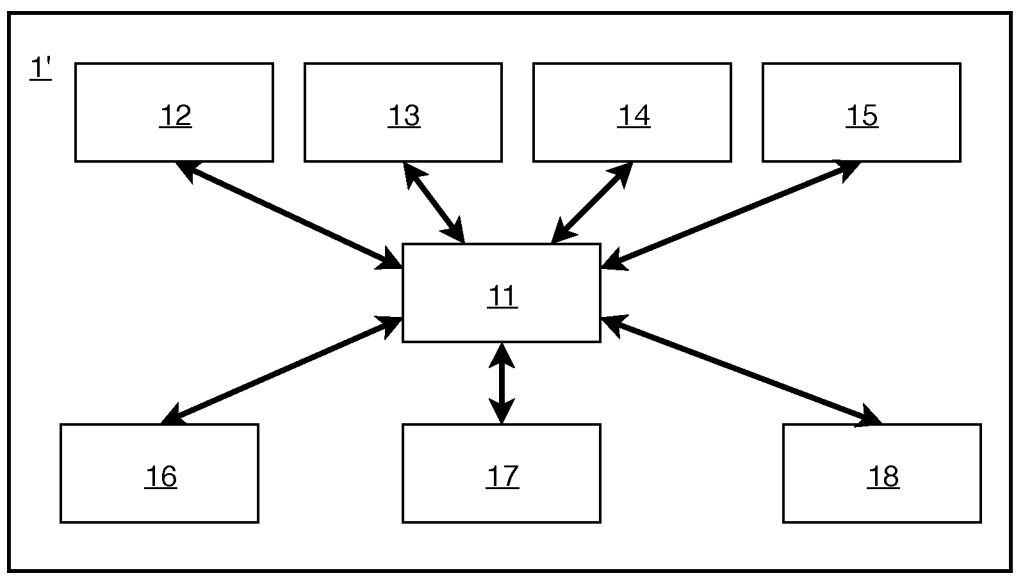
FIG. 2 illustrates an electronic shelf display according to some embodiments of the present disclosure.

FIG. 2 illustrates an electronic shelf display 1' according to some embodiments of the present disclosure. As shown in FIG. 2, the electronic shelf display 1' includes a control module 11, a communication module 12, a display module 13, an electronic paper (ePaper) module 14, a sensing module 15, a power storage module 16, an auxiliary lighting module 17, and a memory module 18. The function and operation of the control module 11, the communication module 12, the display module 13, and the ePaper module 14 are similar to those shown in FIG. 1.

The sensing module 15 includes at least one sensing device. In some embodiments, the sensing device may be a camera, a proximity sensor, an infrared sensor, a light sensor or a combination of the above. In some embodiments, the power storage module 16 includes a battery, such as non-rechargeable battery (e.g., a zinc-carbon battery and an alkaline battery) and rechargeable battery (e.g., a lithium-ion battery). In some embodiments, the auxiliary lighting module 17 includes light emitting diodes (LEDs). In some embodiments, the memory module 18 includes a memory card or a flash memory.

In some embodiments, the sensing device of the sensing module 15 is electrically connected to the control module 11, and senses whether a product on a shelf is absent. That is, the sensing device may sense whether a product is sold out. If the control module 11 receives the signal from the sensing devices indicating that the product is absent, the control module 11 sends a signal via the communication module 12. The signal sent by the control module 11 via the communication module 12 indicates that the product is absent. Such signal can be used to count the product on the shelf, so as to generate sale information or manage inventory.

In some embodiments, the sensing device of the sensing module 15 is electrically connected to the control module 11, and senses whether a person is near the electronic shelf display E. If the sensing device senses that a person is near the electronic shelf display 1', the sensing device sends or outputs a signal to the control module 11. If the control module 11 receives the signal from the sensing device indicating that a person is near the electronic shelf display 1', the control module 11 turns on the display module 13 to display the message or content. If no one near the electronic shelf display 1', the display module 13 is turned off, so as to save power.

In some embodiments, the auxiliary lighting module 17 of the electronic shelf display 1' illuminates the ePaper module 14. In some embodiments, the power storage module 16 supplies power to the auxiliary lighting module 17 when a power supply external to the electronic shelf display 1' is shut down by, for example, power outage or accidentally unplugging. When the power supply external to the electronic shelf display 1' is shut down, the auxiliary lighting module 17 can illuminate the ePaper module 14. Because the message or content displayed on the ePaper module 14 will not vanish when no power is supplied when the power supply external to the electronic shelf display 1' is shut down, the customer can read and view the message or content displayed on the ePaper module 13 with the illumination from the auxiliary lighting module 17.

In some embodiments, the power storage module 17 may supply power to the control module 11. The control module 11 controls the ePaper module 14 to display an arrow indicating a direction of an exit if the power supply external to the electronic shelf display 1' is shut down. In some embodiments, when the power supply external to the electronic shelf display 1' is shut down, the customer can read and view the arrow displayed on the ePaper module 13 with the illumination from the auxiliary lighting module 17, and then leaves the store via the directed exit.

Sometimes, the power supply external to the electronic shelf display 1' is shut down caused by accidentally unplugging rather than power outage. In some embodiments, the sensing device of the sensing module 15 comprises a light sensor electrically connected to the control module 11 and senses ambient light. If the power supply external to the electronic shelf display 1' is shut down, the sensed ambient light is lower than a threshold. It can be determined that the power supply is shut down due to power outage. In this case, the control module 11 controls the ePaper module 14 to display an arrow indicating the direction of an exit.

In some embodiments, the memory module 18 of the electronic shelf display 1' stores data including: one or more messages to be displayed on the display module 13, one or more messages to be displayed on the ePaper module 14, and a time table for displaying the messages to be displayed on the display module 13 and the messages to be displayed on the ePaper module 14. The control module 11 is configured to update content displayed on the display module 13 and content displayed on the ePaper module 14 based on the data stored in the memory module 18. The messages or content displayed on the display module 13 and the ePaper module 14 can thus be scheduled. The electronic shelf display 1' may display different messages on the display module 13 and the ePaper module 14 according to different promotion events at different times.

Figure 3:
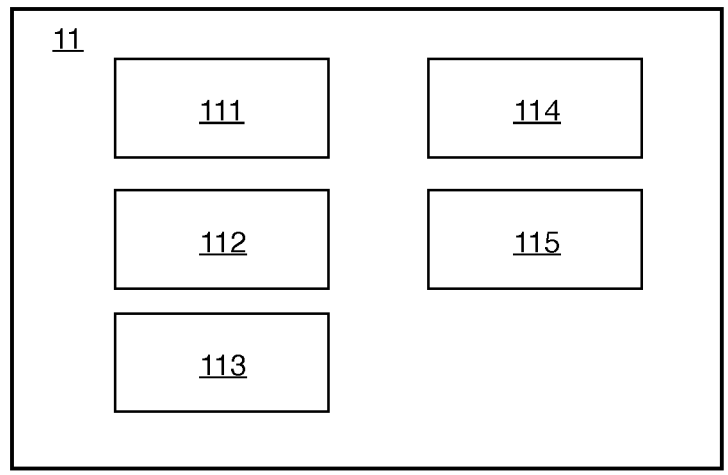
FIG. 3 illustrates a block diagram of a control module according to some embodiments of the present disclosure.

FIG. 3 illustrates a block diagram of the control module 11 according to some embodiments of the present disclosure. In some embodiments, the control module 11 includes a processor 111, a general-purpose input/output module (GPIO) 112, a sensing device control module 113, an image output module 114, and an ePaper control module 115. The processor 111 processes the inputted signals and data and generates corresponding outputs. The sensing device control module 113 is used to communicate with the at least one sensing device of the sensing module 15. In some embodiments, the sensing device control module 113 receives signal and data from the at least one sensing device of the sensing module 15. The image output module 114 outputs messages or content (e.g., images or videos) to the display module 13. The ePaper control module 115 outputs messages or content (e.g., information of a product) to the ePaper module 14. The GPIO module 12 may send signals and data to the processor 111 according to the signals and data inputted from other modules of the electronic shelf display 1 (or 1'). The GPIO module 12 may send signals and data to other modules of the electronic shelf display 1 (or 1') according to the signals and data inputted from the processor. For example, the control module 11 may control the auxiliary lighting module 17 via the GPIO module 112.

Figure 4:
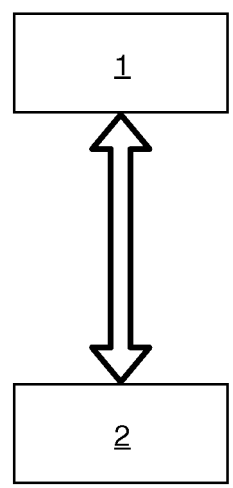
FIG. 4 illustrates the connection between an electronic shelf display and a server according to some embodiments of the present disclosure.

FIG. 4 illustrates the connection between an electronic shelf display 1 (or 1') and a server 2 according to some embodiments of the present disclosure. Through one connection between the electronic shelf display 1 (or 1') and the server 2, content displayed on the display module 13 and the ePaper module 14 can be controlled and updated. Through one interface between the electronic shelf display 1 (or 1') and the server 2, the display module 13 and ePaper module 14 can be controlled and updated. Through one connection between the electronic shelf display 1 (or 1') and the server 2, the display module 13 and ePaper module 14 can be simultaneously controlled and updated. Through one interface between the electronic shelf display 1 (or 1') and the server 2, the display module 13 and ePaper module 14 can be simultaneously controlled and updated.

Figure 5:
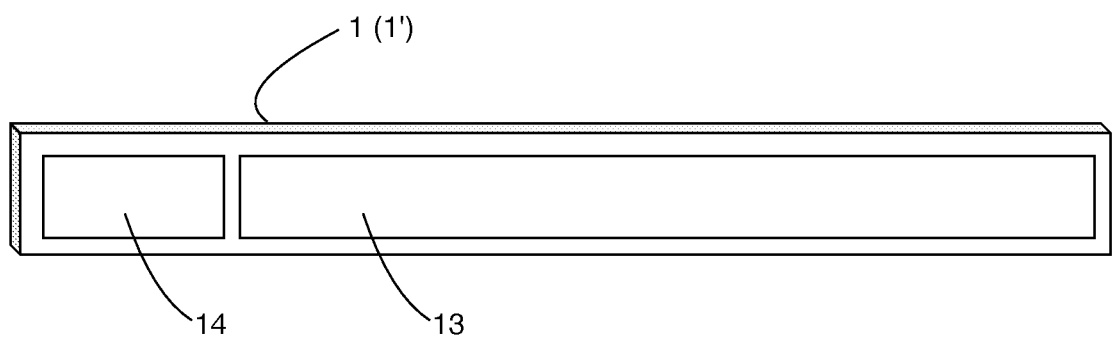
FIG. 5 illustrates a schematic diagram of an electronic shelf display according to some embodiments of the present disclosure.

FIG. 5 illustrates a schematic diagram of an electronic shelf display 1 (or 1') according to some embodiments of the present disclosure. In particular, FIG. 5 illustrates a front side of the electronic shelf display 1 (or 1') according to some embodiments of the present disclosure. The display module 13 and the ePaper module 14 are disposed on the front side of the electronic shelf display 1 (or 1'). The electronic shelf display 1 (or 1') in FIG. 5 is attached to or disposed on a shelf in a store such that the front side of the electronic shelf display 1 (or 1') faces away from the shelf. The electronic shelf display 1 (or 1') in FIG. 5 is attached to or disposed on a shelf such that the front side of the electronic shelf display 1 (or 1') faces toward the customer and the back side (which is opposite to the front side) of electronic shelf display 1 (or 1') faces toward the products on the shelf. The display module 13 and the ePaper module 14 of the electronic shelf display 1 (or 1') display message or content for the customer standing in front of the shelf or the electronic shelf display 1 (or 1').

In some embodiments, the electronic shelf display 1' shown in FIG. 5 includes the sensing module, the power storage module, and the auxiliary lighting module (which are not shown in FIG. 5). The sensing module includes at least one sensing device. In some embodiments, the sensing device may be a camera, a proximity sensor, an infrared sensor, a light sensor or a combination of the above. In some embodiment, a sensing device (such as a camera, a proximity sensor, and an infrared sensor) may be disposed on the front side of the electronic shelf display 1' of FIG. 5. The sensing device on the front face may be used to detect whether a customer is standing in front of the electronic shelf display 1'. If a customer is standing in front of the electronic shelf display 1', the display module 13 of the electronic shelf display 1' are turned on and display message or content for the customer. If no customer are standing in front of the electronic shelf display 1', the display module 13 of the electronic shelf display 1' may be turned off to save power.

In some embodiments, a sensing device (such as a camera, a proximity sensor, and an infrared sensor) may be disposed on the back side of the electronic shelf display 1' of FIG. 5. The sensing device on the back side may be used to detect whether a product on the shelf (on which the electronic shelf display 1' is disposed) is absent. If a product on the shelf is absent, the electronic shelf display 1' sends a signal to the server (i.e., the server 2) to notify the manager of the store. Such signal can be used to count the product on the shelf, so as to generate sale information or manage inventory.

In some embodiments, a light sensor may be disposed on the electronic shelf display 1' of FIG. 5. The auxiliary lighting module 17 may be disposed around the ePaper module 14. The light sensor is used to senses the ambient light. If the power supply external to the electronic shelf display 1' is shut down, the sensed ambient light is lower than a threshold. It can be determined that the power supply is shut down due to power outage. In this case, the power for the auxiliary lighting module 17 is provided by the power storage module 16, so as to illuminate the ePaper module 14.

As used herein, the singular terms "a," "an," and "the" may include plural referents unless the context clearly indicates otherwise. For example, reference to an electronic device may include multiple electronic devices unless the context clearly indicates otherwise.

As used herein, the terms "connect," "connected," and "connection" refer to an operational coupling or linking. Connected components can be directly or indirectly coupled to one another through, for example, another set of components.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless otherwise specifically indicated herein, the order and grouping of the operations are not limitations of the present disclosure.

What is claimed is:

1. An electronic shelf display (1), comprising:
    a display module (13);
    an electronic paper (ePaper) module (14);
    a communication module (12) that receives a first signal indicating a first message to be displayed on the display module and receives a second signal indicating a second message to be displayed on the ePaper module;
    a control module (11), electrically connected to the communication module, the display module, and the ePaper module, that controls the display module and the ePaper module based on the first massage and the second message received by the communication module (12);
    an auxiliary lighting module (17) that illuminates the ePaper module (14);
    a power storage module (16) that supplies power to the auxiliary lighting module when a power supply external to the electronic shelf display is shut down; and
    a sensing device (15), electrically connected to the control module (11), that senses ambient light,
    wherein the power storage module (17) supplies power to the control module (11), the control module controls the ePaper module (14) to display an arrow indicating a direction of an exit when the power supply external to the electronic shelf display is shut down, and
    wherein the control module determines whether the sensed ambient light is lower than a threshold or not and controls the ePaper module (14) to display the arrow indicating the direction of the exit when the power supply external to the electronic shelf display is shut down.

2. The electronic shelf display of claim 1, further comprising:
    at least one sensing device (15), electrically connected to the control module, that senses whether a product on a shelf is absent,
    wherein the sensing device determines whether the product on the shelf is absent or not, and the control module (11) sends a third signal, via the communication module, indicating that the product is absent if an input of the control module from the sensing device indicates that the product is absent.

3. The electronic shelf display of claim 1, further comprising:
    at least one sensing device (15), electrically connected to the control module (11), that senses whether a person is near the electronic shelf display (1'),
    wherein the sensing device determines whether a person is near the electronic shelf display (1') or not, and the control module (11) turns on the display module (13) to display the first message if an input of the control module (11) from the sensing device (15) indicates that there is a person near the electronic shelf display (1').

4. The electronic shelf display of claim 3, wherein the sensing device (15) comprises at least one of a proximity sensor and a camera.

5. The electronic shelf display of claim 1, wherein the control module (11) is configured to simultaneously update the first message displayed on the display module (13) and the second message displayed on the ePaper module (14).

6. The electronic shelf display of claim 1, wherein the first message to be displayed on the display module comprises images or videos.

7. The electronic shelf display of claim 1, wherein the second message to be displayed on the ePaper module comprises a price of a product on a shelf.

8. An electronic shelf display (1), comprising:
    a display module (13);
    an electronic paper (ePaper) module (14);
    a communication module (12) that receives a first signal indicating a first message to be displayed on the display module and receives a second signal indicating a second message to be displayed on the ePaper module;
    a control module (11), electrically connected to the communication module, the display module, and the ePaper module, that controls the display module and the ePaper module; and
    a memory module (18) that stores data comprising one or more first messages to be displayed on the display module, one or more second messages to be displayed on the ePaper module, and a time table for displaying the one or more first messages and the one or more second messages, wherein the control module is configured to update content displayed on the display module and content displayed on the ePaper module based on the data stored in the memory module (18).

9. The electronic shelf display of claim 8, further comprising:

at least one sensing device (15), electrically connected to the control module, that senses whether a product on a shelf is absent, wherein the sensing device determines whether the product on the shelf is absent or not, and the control module (11) sends a third signal, via the communication module, indicating that the product is absent if an input of the control module from the sensing device indicates that the product is absent.

10. The electronic shelf display of claim 8, further comprising:

at least one sensing device (15), electrically connected to the control module (11), that senses whether a person is near the electronic shelf display (1'), wherein the sensing device determines whether a person is near the electronic shelf display (1') or not, and the control module (11) turns on the display module (13) to display the first message if an input of the control module (11) from the sensing device (15) indicates that there is a person near the electronic shelf display (1').

11. The electronic shelf display of claim 10, wherein the sensing device (15) comprises at least one of a proximity sensor and a camera.

12. The electronic shelf display of claim 8, wherein the control module (11) is configured to simultaneously update the first message displayed on the display module (13) and the second message displayed on the ePaper module (14).

13. The electronic shelf display of claim 8, wherein the first message to be displayed on the display module comprises images or videos.

14. The electronic shelf display of claim 13, wherein the second message to be displayed on the ePaper module comprises a price of a product on a shelf.

* * * * *

UNITED STATES PATENT AND TRADEMARK OFFICE
CERTIFICATE OF CORRECTION

PATENT NO. : 10,803,783 B2
APPLICATION NO. : 16/263535
DATED : October 13, 2020
INVENTOR(S) : Tsun-I Wang et al.

It is certified that error appears in the above-identified patent and that said Letters Patent is hereby corrected as shown below:

In the Claims

Claim 2, Column 8, Lines 19, 20 and 21, delete "further comprising: at least one" and insert --wherein the--

Claim 2, Column 8, Lines 21 and 22, delete ", electrically connected to the control module, that" and insert --is further configured to--

Claim 2, Column 8, Line 22, delete "senses" and insert --sense--

Claim 3, Column 8, Lines 30, 31 and 32, delete "further comprising: at least one" and insert --wherein the--

Claim 3, Column 8, Lines 32 and 33, delete ", electrically connected to the control module (11), that" and insert --is further configured to--

Claim 3, Column 8, Line 33, delete "senses" and insert --sense--

Claim 14, Column 10, Line 18, delete "13" and insert --8--

Signed and Sealed this
Twenty-first Day of February, 2023

Katherine Kelly Vidal
*Director of the United States Patent and Trademark Office*